United States Patent
Otremba

(10) Patent No.: US 10,730,499 B2
(45) Date of Patent: Aug. 4, 2020

(54) ELECTRONICALLY CONTROLLABLE PNEUMATIC BRAKING SYSTEM IN A COMMERCIAL VEHICLE AND METHOD FOR ELECTRONICALLY CONTROLLING A PNEUMATIC BRAKING SYSTEM

(71) Applicant: WABCO GmbH, Hannover (DE)

(72) Inventor: Robert Otremba, Ronnenberg (DE)

(73) Assignee: WABCO GMBH, Hannover (DE)

( * ) Notice: Subject to any disclaimer, the term of this patent is extended or adjusted under 35 U.S.C. 154(b) by 368 days.

(21) Appl. No.: 15/746,805

(22) PCT Filed: Jun. 24, 2016

(86) PCT No.: PCT/EP2016/001081
§ 371 (c)(1),
(2) Date: Jan. 23, 2018

(87) PCT Pub. No.: WO2017/036569
PCT Pub. Date: Mar. 9, 2017

(65) Prior Publication Data
US 2019/0337503 A1 Nov. 7, 2019

(30) Foreign Application Priority Data

Sep. 2, 2015 (DE) .......................... 10 2015 011 296

(51) Int. Cl.
*B60T 13/68* (2006.01)
*B60T 7/04* (2006.01)
(Continued)

(52) U.S. Cl.
CPC ............ *B60T 13/683* (2013.01); *B60T 7/042* (2013.01); *B60T 7/12* (2013.01); *B60T 8/17* (2013.01);
(Continued)

(58) Field of Classification Search
CPC ... B60T 7/042; B60T 7/12; B60T 8/17; B60T 8/1708; B60T 8/176; B60T 13/26;
(Continued)

(56) References Cited

U.S. PATENT DOCUMENTS

| 5,624,163 A * | 4/1997 | Kiel | B60T 8/00 |
| | | | 303/6.01 |
| 6,260,934 B1 * | 7/2001 | Lee | B60T 7/122 |
| | | | 303/192 |

(Continued)

FOREIGN PATENT DOCUMENTS

| DE | 2818813 C3 | 3/1996 |
| DE | 19504394 C1 | 3/1996 |

(Continued)

*Primary Examiner* — Thomas W Irvin
(74) *Attorney, Agent, or Firm* — Leydig, Voit & Mayer, Ltd.

(57) ABSTRACT

An electronically controllable pneumatic brake system includes a brake circuit, wherein a control valve is associated with the brake circuit for the purpose of adjusting braking pressures at service brakes independently of each other, wherein the control valve comprises an electronic control input for receiving an electrical control signal and a pneumatic control input for receiving a control pressure. The pneumatic brake system additionally includes a first control unit for outputting the electronic control signal depending on a target vehicle deceleration for the electrical actuation of the control valve, a first brake valve configured to specify a first brake valve control pressure, and a second brake valve configured to output a second brake valve control pressure. The second brake valve is disposed such that the first brake valve control pressure and/or the second brake valve control pressure is output as the control pressure to the control valve.

25 Claims, 7 Drawing Sheets

(51) Int. Cl.
*B60T 7/12* (2006.01)
*B60T 8/17* (2006.01)
*B60T 8/176* (2006.01)
*B60T 13/26* (2006.01)
*B60T 15/02* (2006.01)

(52) U.S. Cl.
CPC ............ *B60T 8/176* (2013.01); *B60T 8/1708* (2013.01); *B60T 13/26* (2013.01); *B60T 15/027* (2013.01); *B60T 2270/10* (2013.01); *B60T 2270/402* (2013.01); *B60T 2270/413* (2013.01); *B60T 2270/82* (2013.01)

(58) Field of Classification Search
CPC .. B60T 13/683; B60T 15/027; B60T 2270/10; B60T 2270/402; B60T 2270/413; B60T 2270/82
See application file for complete search history.

(56) References Cited

U.S. PATENT DOCUMENTS

| | | | |
|---|---|---|---|
| 6,659,244 B2 | 12/2003 | Goodell | |
| 7,520,572 B2 | 4/2009 | Hatipoglu et al. | |
| 8,060,287 B2* | 11/2011 | Headlee | B60L 7/26 303/152 |
| 9,327,694 B2* | 5/2016 | Klostermann | B60T 11/108 |
| 9,764,724 B2* | 9/2017 | Kiel | B60T 13/24 |
| 2006/0152075 A1 | 7/2006 | Goebels et al. | |
| 2010/0125398 A1* | 5/2010 | Headlee | B60L 7/26 701/71 |
| 2013/0221735 A1 | 8/2013 | Kiel et al. | |
| 2015/0084402 A1* | 3/2015 | Tober | B60T 8/885 303/20 |
| 2015/0239441 A1* | 8/2015 | Klostermann | B60T 13/581 303/7 |
| 2019/0152459 A1* | 5/2019 | Dieckmann | B60T 13/662 |
| 2019/0248351 A1* | 8/2019 | Wulf | B60T 13/683 |
| 2020/0070795 A1* | 3/2020 | Van Thiel | B60T 13/68 |
| 2020/0086840 A1* | 3/2020 | Couppee | B60T 13/683 |

FOREIGN PATENT DOCUMENTS

| | | |
|---|---|---|
| DE | 19750932 C1 | 9/1999 |
| DE | 10042215 C1 | 11/2001 |
| DE | 10036286 A1 | 2/2002 |
| DE | 102010050578 A1 | 5/2012 |
| DE | 102013015949 A1 | 3/2015 |
| DE | 102014013882 A1 | 3/2015 |
| EP | 1530529 B1 | 5/2007 |
| EP | 1730006 B1 | 12/2012 |

* cited by examiner ions by means of a control signal to the proportionality valve, which then adjusts a corresponding control pressure at the relay valve, wherein with proper operation the control pressure of the braking force controller is set slightly lower than the control pressure of the electronically controlled proportionality valve. In the event of an electrical failure, as a result a fallback is formed, since if the electronically controlled proportionality valve fails or has a fault, the control pressure determined by the braking force controller is automatically higher and is thus used for braking pressure adjustment by the relay valve.

ELECTRONICALLY CONTROLLABLE PNEUMATIC BRAKING SYSTEM IN A COMMERCIAL VEHICLE AND METHOD FOR ELECTRONICALLY CONTROLLING A PNEUMATIC BRAKING SYSTEM

CROSS REFERENCE TO RELATED APPLICATIONS

This application is a U.S. National Stage Application under 35 U.S.C. § 371 of International Application No. PCT/EP2016/001081 filed on Jun. 24, 2016, and claims benefit to German Patent Application No. DE 10 2015 011 296.1 filed on Sep. 2, 2015. The International Application was published in German on Mar. 9, 2017 as WO 2017/036569 A1 under PCT Article 21(2).

FIELD

The invention concerns an electronically controllable brake system in a utility vehicle, in particular in an autonomously controllable utility vehicle, and a method for electronically controlling a pneumatic brake system.

BACKGROUND

In vehicles, in particular utility vehicles, with a pneumatic brake system, in particular embodied as an electronic brake system (EBS) or an anti-lock brake system (ABS), for adjusting braking pressures from a control unit (ECU), electronic control valves, for example relay valves or axle modulators, can be actuated, which then pneumatically pass a braking pressure to the brake cylinders of the service brakes of the brake system. Depending on a demanded target vehicle deceleration, the adjustment of a braking pressure is superimposed on the electronically adjusted pneumatic braking pressure depending on the actuation of a braking force controller or brake value generator by means of a brake pedal operation by the driver, so that the driver in the autonomously controlled vehicle can also still complete emergency braking himself and/or can override the electronically controlled braking pressure in an emergency.

It is a disadvantage with previous solutions in known vehicles with pneumatic brake systems that there is no electronically controllable fallback in the event of a failure of the electronic actuation of the control valves. The pneumatic fallback of a conventional brake system only functions if the driver also operates the brake pedal. This is not the case as a rule in the case of an autonomously controlled vehicle, in particular if no driver is sitting in the vehicle or the driver is not paying attention.

DE 197 50 932 A1 discloses a brake controller for a rear axle with a relay valve as a control valve, an electronically controlled proportionality valve and a pneumatic braking force controller. The proportionality valve and the braking force controller are connected via pneumatic control inputs to the relay valve and transfer a defined control pressure to the control input of the relay valve. The relay valve in turn adjusts the higher of the two control pressures in proportion as the braking pressure at the brake cylinders of the service brakes of the rear axle. Furthermore, a brake valve is provided, the setting of which is dependent on the operation of the brake pedal by the driver and which determines the braking pressure to be adjusted by the relay valve. In addition, a brake valve control pressure is transferred pneumatically to the braking force controller by the brake valve and at the same time is transferred electrically by control DE 28 18 813 C3 describes an arrangement for preventing spinning of the wheels. In this case, on activating the arrangement a solenoid valve is opened, which releases the working pressure from a pressure reservoir container, so that it can be adjusted at the solenoid control valves on the rear wheels via a directional valve. The solenoid valve is controlled in this case by a comparison device such that in the event of spinning of the rear wheels while driving off, the rear wheels are braked by the solenoid control valves and as a result the speed of the rear wheels is adjusted to the speed of the front wheels. If a braking process is initiated at the same time, the directional valve is changed over so that braking pressure is only fed from the brake valve to the solenoid control valves and deceleration of the wheels takes place as a result.

DE 10 2014 013 882 discloses a method for detecting unintentional pneumatic activation of a relay valve, wherein the relay valve is provided for operating the service brakes and receives demands both from a brake valve and from a controller or regulator for automatic braking.

U.S. Pat. No. 7,520,572 B2 and EP 1 730 006 B1 reveal a method with which the brake valve in addition to the brake pedal can be actuated by an electronic control unit. Therefore, an electronic brake system is provided, the service brakes of which are controlled by the brake valve and by an additional relay valve. On the one hand, the braking demand to the brake valve can be determined by means of the brake pedal or even independently thereof by means of a brake valve actuator that is disposed between the brake pedal and the brake valve. The brake valve actuator is controlled by the electronic control unit by adjusting a control pressure at the brake valve actuator, which is embodied as a pneumatic valve for example, if there is a control signal for decelerating the vehicle, so that the brake valve is actuated.

U.S. Pat. No. 6,659,244 B2 discloses a possible brake valve actuator for U.S. Pat. No. 7,520,572 B2 or EP 1 730 006 B1, which is disposed between the brake pedal and the brake valve and which is implemented as a pneumatic actuator with a piston. If there is a control pressure from the electronic control unit, the pneumatic actuator keeps the piston rod of the brake valve in the actuated position thereof, independently of the position of the brake pedal, in order for example to be able to provide pre-trip functionality when the vehicle is at a standstill.

EP 1 530 529 B1 discloses a pressure control module for a pneumatic brake system of a vehicle. In this case, it is provided that a relay valve controlling the service brake is actuated by means of a directional valve, wherein the actuation is carried out by an ABS control unit depending on whether slip is occurring. Furthermore, it is provided to use such an arrangement in a traction control system by connecting a further directional valve upstream, which connects the compressed air connection of the directional valve to a pressure reservoir container depending on the existence of slip in the drive, so that the pressure at the service brakes can also be increased via the relay valve.

DE 10 2010 050 578 A1 discloses a brake system in which a braking demand is specified by means of a brake valve or a brake pedal device. This is converted in a control device into an electrical signal and a control valve that adjusts the braking pressure at the service brakes is actuated with the electrical signal. If the electronics fail, in the case of redundancy the control valve is controlled pneumatically by the service brake valve via compressed air lines and furthermore adjusts a braking pressure at the service brakes. In this case, the control valve comprises a plurality of solenoid valves and a relay valve. The solenoid valves can increase, maintain or reduce the braking pressure at the service brakes adjusted by the relay valve depending on the desired function by means of the control pressure by energizing the respective solenoid valve.

DE 10 2013 015 949 A1 describes a brake system for assistance in turns, wherein it is provided to adjust a braking pressure at service brakes of the brake system with an electronically controlled multiway valve, wherein a braking pressure is also adjusted if there is no braking demand from a first brake valve forming the brake value transmitter. In this case, the multiway valve and the first brake valve are switched via a shuttle valve to a relay valve that adjusts the braking pressure at the service brakes. In this case, the shuttle valve only provides the higher of the two pressures from the first brake valve and the shuttle valve to the relay valve, so that the electrical demand on the multiway valve can be overridden by the first brake valve.

SUMMARY

In an embodiment, the present invention provides an electronically controllable pneumatic brake system. The pneumatic brake system includes a brake circuit, wherein a control valve is associated with the brake circuit for the purpose of adjusting, in the brake circuit, braking pressures at service brakes independently of each other, wherein the control valve comprises an electronic control input for receiving an electrical control signal and a pneumatic control input for receiving a control pressure, and wherein the control valve is configured to supply the service brakes of the brake circuit with a braking pressure via working connections depending on the control signals or the control pressure. The pneumatic brake system additionally includes a first control unit for outputting the electronic control signal depending on a target vehicle deceleration for the electrical actuation of the control valve, wherein the target vehicle deceleration can be specified by a first brake valve; the first brake valve, configured to specify a first brake valve control pressure at the at least one brake circuit; and a second brake valve configured to output a second brake valve control pressure, the second brake valve being disposed in the pneumatic brake system such that the first brake valve control pressure of the first brake valve and/or the second brake valve control pressure of the second brake valve is output as the control pressure to the control valve for the pneumatic actuation of the control valve. The second brake valve is configured to be electronically controlled if electrical actuation of the control valve is prevented to create an electronically-pneumatically controlled redundancy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
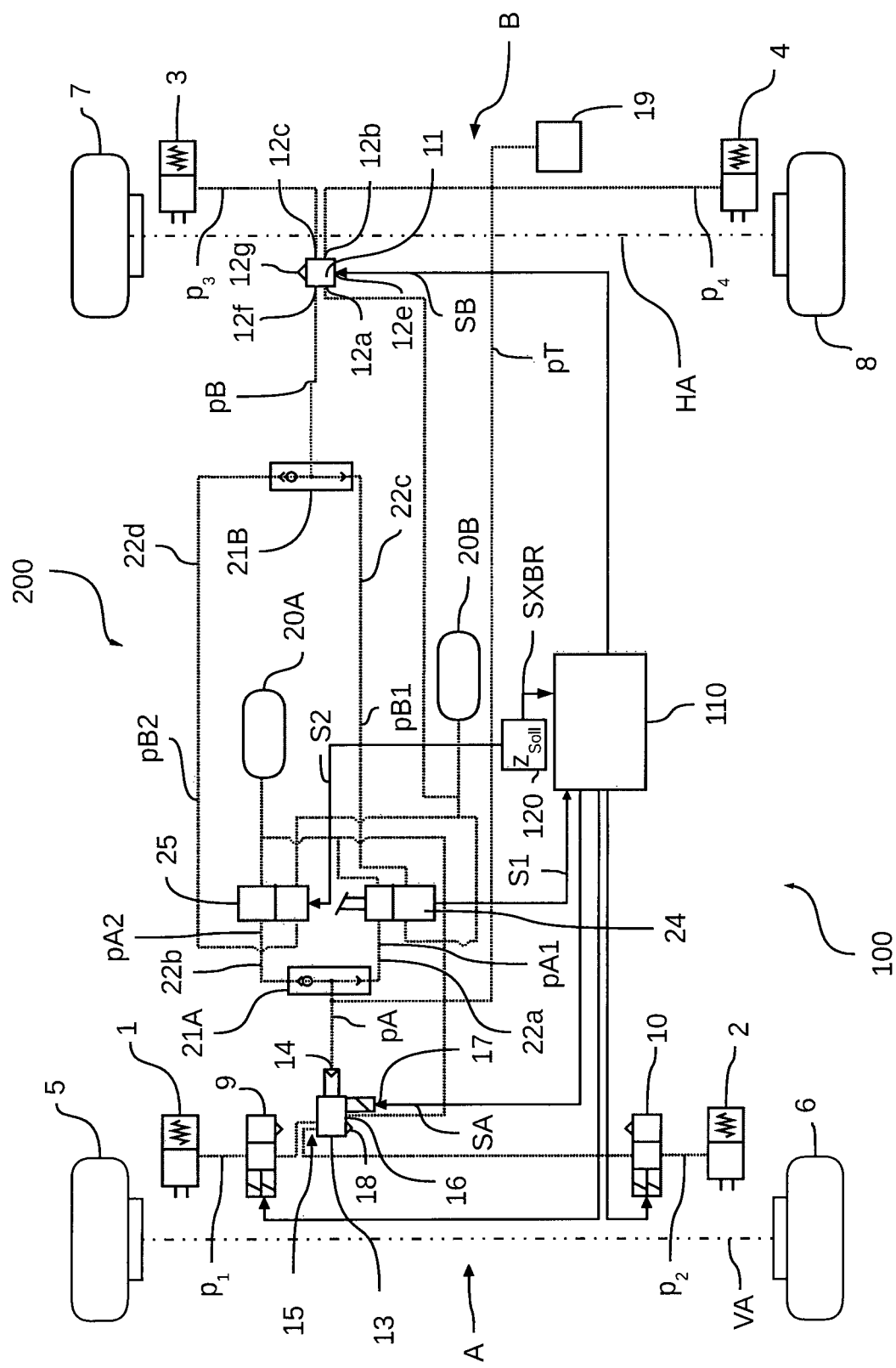
FIGS. 1a,b are block diagrams of a vehicle with an electronically controlled pneumatic brake system.

Embodiments of the invention provide for electronically controlled actuation for a pneumatic brake system and for the electronic control of the pneumatic brake system that guarantees safe and reliable braking in an autonomously controllable vehicle, in particular with electronic redundancy.

According to embodiments of the invention, an additional electronically controlled second brake valve is disposed in an electronically controllable pneumatic brake system, which can adjust a second brake valve control pressure, which is preferably adjusted proportionally or with pulses, with an electronically specified braking demand. The additional second brake valve is disposed in the brake system parallel to a first brake valve, for example a brake value transmitter or a foot brake valve, and is connected to at least one electronically and pneumatically controllable control valve.

Owing to the parallel design and the electronic actuation of the second brake valve, already the advantage can be achieved that an electronically-pneumatically controllable fallback can be embodied in an autonomously controlled vehicle with an electronically controlled pneumatic brake system, for example. This is because for the case in which the at least one control valve that is electronically controlled by a first control unit by means of electrical control signals to bring about a target vehicle deceleration cannot be controlled, for example because of an electrical defect in the signal transmission from the first control unit, an electrical demand signal can be output to the additional second brake valve by means of a second control unit, which can also be integrated within the first control unit. Depending on the electrical demand signal, the second brake valve pneumatically adjusts a second brake valve control pressure at the at least one control valve of the respective brake circuit or directly at the brake cylinders of the respective service brakes in order to still bring about the autonomously demanded braking to achieve the target vehicle deceleration.

Thus, electronic-pneumatic actuation, which can otherwise only be guaranteed by the driver operating the brake pedal, can advantageously be used in an autonomously controlled vehicle by purely electronic actuation of the control valves. Here the second brake valve takes on the task of the mechanical operation of the brake pedal quasi-electronically. Thus, a plurality of fallbacks or redundancies can be advantageously implemented by electronically controllable pneumatic brake systems according to embodiments of the invention if the electronic actuation of the control valves fails.

A fallback or redundancy, in particular a first one, is therefore produced by the mechanical operation of the brake pedal, for example by pressing the brake pedal by the driver, depending on which a control pressure is pneumatically adjusted, i.e. a mechanical-pneumatic redundancy. If the driver is inattentive or the vehicle is driving autonomously without a driver, a further, in particular a second, electronically-pneumatically controlled fallback or redundancy is implemented by the second brake valve, wherein both fallbacks can operate in parallel with each other.

In this case, each of the at least one control valves is associated with a brake circuit of a vehicle, in particular a utility vehicle, and adjusts braking pressures at service brakes of the respective brake circuit. In a pneumatic brake system, in which the electronic actuation of the service brakes takes place on only one vehicle axle, for example a driven rear axle, thus only one electronically and pneumatically controllable control valve is provided. In a dual-circuit pneumatic brake system with electronic actuation of the service brakes, a control valve is provided for each brake circuit on a front axle and the service brakes on the driven rear axle, for example.

In this case, the target vehicle deceleration is specified by the second control unit for example, wherein the second control unit is autonomously controlling the vehicle, i.e. in particular it is also deciding the negative acceleration with which the utility vehicle is to be decelerated. The target vehicle deceleration is transmitted in normal operation by means of an XBR signal to the first control unit, which depending thereon electronically controls the at least one control valve by means of the control signal. By means of the XBR signal, thus an external braking demand is transmitted from the second control unit to the first control unit. Instead of the target vehicle deceleration, a target pressure or a pulse time for the pulsed control of the control valves can be specified by the second control unit. If the XBR signal cannot be transmitted to the first control unit or even the control signal cannot be transmitted to the at least one control valve, then the redundancy case occurs, in particular the second redundancy case, in which the second control unit controls the second brake valve accordingly by means of the demand signal for redundant enforcement of the target vehicle deceleration. By means of the demand signal, a target pressure or a pulse time for the pulsed control of the second brake valve can even be specified instead of the target vehicle deceleration.

In order to output either the braking demand from the first brake valve or the autonomous braking demand from the second brake valve by means of the brake valve control pressure at the control valve, at least one additional shuttle valve can be provided between the brake valves and the at least one control valve, which in the case of redundancy advantageously enables driver braking: if the driver operates the brake pedal during actuation of the second brake valve, i.e. in redundancy situation, so hard that a first brake valve control pressure adjusted by the first brake valve because of the driver operation is greater than the second brake valve control pressure electronically demanded by the second brake valve, which is specified by the autonomous braking, then the at least one shuttle valve adjusts said higher first brake valve control pressure. This is because the at least one shuttle valve is embodied such that only the higher of the applied brake valve control pressures is forwarded as a control pressure to the at least one control valve of the respective brake circuit, i.e. in this case the braking demand is output by the driver to the at least one control valve; the autonomous braking is thereby superseded or overridden by the driver. The driver can intervene in the braking process, for example during an emergency braking situation.

In this case, the at least one shuttle valve can also already be integrated within the at least one control valve, a first brake valve or a second brake valve, in order to advantageously achieve a transfer of pressure over short distances.

In this case, the at least one shuttle valve can be implemented as a pneumatic shuttle valve, which when pneumatically controlled passes the higher applied brake valve control pressure through, or even as an electrically controlled shuttle valve, for example as a 3/2-way valve, which when suitably electronically controlled adjusts the higher of the two brake valve control pressures at the at least one control valve, in particular in a pulsed manner. Other switching valves having such functionality are also conceivable, however. For example, the 3/2-way valve can be electronically controlled instead of pulsed and held permanently in an open state, so that a maximum or medium specified braking pressure can be output by the control valve.

Alternatively, the shuttle valve can also be omitted, so that both the first brake valve and the second brake valve can be connected to the at least one control valve, for example via a T-piece. Thus, both the first brake valve control pressure from the first brake valve and the second brake valve control pressure from the second brake valve are transferred at the same time to the at least one control valve, wherein the control valve is then pneumatically controlled with the sum or an average value of the two control pressures. Then driver braking can be achieved by means of the first brake valve and electronically controlled braking can be achieved by means of the second brake valve in the case of redundancy.

The second brake valve is for example implemented as a 1-channel proportionality valve, so that a second brake valve control pressure that is preferably proportional to the target vehicle deceleration can be output to the at least one brake circuit of the vehicle. A 1-channel proportionality valve can also be used for the second brake valve for example, which for example operates like a conventional 1-channel axle modulator that adjusts a braking pressure proportional to the control pressure at a service brake of a vehicle axle. In this case, the 1-channel axle modulator can thus be used as the second brake valve so that the electrical demand signal specified by the second control unit—analogous to the control pressure—is proportionally adjusted as the second brake valve control pressure at the at least one shuttle valve of the respective brake circuit.

In the case of a dual-circuit electronically controlled brake system, the second brake valve can advantageously be implemented as a 2-channel proportionality valve, so that a second brake valve control pressure that is preferably proportional to the target vehicle deceleration can be output to both brake circuits. In addition, for example, a 2-channel proportionality valve can be used, which operates for example as a conventional 2-channel axle modulator that adjusts a braking pressure proportional to the control pressure at two service brakes of a vehicle axle. In this case, the 2-channel axle modulator can thus be used so that the electrical demand signal specified by the second control unit—analogous to the control pressure—is adjusted proportionally as the second brake valve control pressure at the shuttle valves of the first and second brake circuits. It is however also possible to use two 1-channel proportionality valves, each controlled by the second control unit with the demand signal, in a dual-circuit brake system, which can also be integrated within the corresponding control valves, in order to advantageously obtain short transfer paths.

Alternatively, the additional second brake valve can also be implemented as a directional valve, in particular as a 3/2-way valve, which can be electronically controlled by the second control unit, for example in a pulsed manner over a pulse period. In this case, the 3/2-way valve is opened over the pulse period until a second brake valve control pressure is adjusted in proportion to the specified target vehicle deceleration. Alternatively, the 3/2-way valve can also be opened permanently instead of in a pulsed manner to adjust a maximum second brake valve control pressure corresponding to the reservoir pressure and thereby to specify a maximum braking pressure.

In a further preferred embodiment, the second brake valve implemented as a 3/2-way valve can also perform the functionality of the shuttle valve at the same time, i.e. in the case of redundancy the second brake valve is electronically controlled by the second control unit such that the second brake valve control pressure is passed through in a pulsed manner to the at least one control valve. If it is detected that in the case of emergency braking the first brake valve is also actuated, instead of this the first brake valve control pressure is passed through to the at least one control valve by the shuttle valve function of the second brake valve, wherein for example this can also be controlled by the second control unit.

As a result, a simplified design with less cabling and fewer components can be used, whereby the costs of assembly and expenditure can be minimized.

The first brake valve or the brake value transmitter can also preferably be implemented as a proportionality valve. As a result, controlled actuation of the at least one control valve can be carried out by the control pressure forwarded by the respective shuttle valve. Alternatively, a first brake valve is possible that is implemented as a directional valve, in particular a 3/2-way valve, which adjusts a corresponding first brake valve control pressure in a pulsed manner. the first brake valve can preferably also be implemented as an electromechanical brake valve that for example can be actuated electronically by the first or second control unit, so that additional redundancy can be advantageously created.

Thus, in order to produce the two fallbacks in an existing electronic brake system, only a second brake valve, for example a proportionality valve or a directional valve, in particular actuated in a pulsed manner, and a shuttle valve or a T-piece are to be retrospectively fitted in the at least one brake circuit, wherein for one brake circuit a 1-channel proportionality valve or a 1-channel directional valve, preferably a 3/2-way valve, and for at least two brake circuits a 2-channel proportionality valve or a 2-channel directional valve, preferably made of two 3/2-way valves, can be used for controlling both brake circuits. The second control unit can accordingly be retrospectively fitted with software that, on detecting a defect or a failure in the electronics of the first control unit, transmits an electrical demand signal to the second brake valve to actuate the control valves. In the at least one control valve a change from electronic actuation to pneumatic actuation can then be made by means of a suitable integrated redundancy function, so that the at least one control valve is no longer controlled by the electrical control signals but can be proportionally controlled by the control pressures, which are for example preferably adjusted by the shuttle valves, by means of a control-relay valve integrated within the control valve.

Thus, two fallbacks, an electrical-pneumatic and a mechanical-pneumatic fallback, can be implemented advantageously with simple means and with little cost in an existing electronically controlled pneumatic brake system just by carrying out retrospective fitting of a few components.

The at least one control valve is for example implemented as a proportionally controlling relay valve or as an axle modulator, wherein the relay valve can be provided for example for the first brake circuit on the front axle and the axle modulator can be provided for the second brake circuit on the driven rear axle. Alternatively, axle modulators can also be used on both vehicle axles, for example a 1-channel axle modulator can be used on the front axle and a 2-channel axle modulator can be used on the rear axle. In particular in the case of redundancy, both control valves enable adjustment of a braking pressure in proportion to an applied control pressure, which for example is adjusted by the respective shuttle valve. The first and the second brake valves adjust a brake valve-relay valve control pressure for the first brake circuit and a brake valve-axle modulator control pressure for the second brake circuit as brake valve control pressures in the respective brake circuits, in particular at the respective shuttle valves in the corresponding brake circuits.

During normal operation of the vehicle, both control valves can also be electrically controlled by means of control signals by the first control unit, in order to autonomously achieve a target vehicle deceleration, for example as demanded by the second control unit, or even in an emergency also to achieve a target vehicle deceleration that is manually specified by the driver by means of the first brake valve. For this, in the case of manual operation of the first brake valve by the driver an actuation signal can be output to the first control unit, which then electrically outputs a corresponding vehicle deceleration as a control signal to the control valves.

Alternatively, directional valves, in particular 3/2-way valves, can also be provided as control valves, which are controlled in a pulsed manner by the second control unit in the case of redundancy for example, in order to output a braking pressure proportional to the control pressure at the service brakes.

With said implementation of the control valves, pneumatic brake systems according to embodiments of the invention can also be a pneumatic brake system with an anti-lock brake function, referred to below as an ABS brake system. Advantageously, for this purpose pneumatically controllable relay valves are used in the ABS brake system as control valves for each vehicle axle, which in addition to the pneumatic adjustment by means of the first brake valve, in particular in the form of a braking value transmitter or a foot brake valve, can additionally also be controlled by means of an electronically controllable 3/2-way valve. Thus, the redundancy according to embodiments of the invention can also be implemented in an ABS brake system with the same advantages as with an EBS brake system by resorting to a control pressure for the pneumatic actuation of the control valve by means of the relay valve in the event of a failure of the electronic actuation of the control valve by means of the 3/2-way valve.

Thus, with brake systems according to embodiments of the invention, in particular an electrical-pneumatic and a mechanical-pneumatic fallback can be implemented both in an EBS brake system and in an ABS brake system, each with electronically actuated control valves, in order to supply the service brakes with a braking pressure, and thereby to be able to respond during autonomous braking even in an ABS braking slip situation if the electronic actuation fails. Further redundant sensors may also be able to be provided in the vehicle for detecting the ABS braking slip situation.

Brake systems according to embodiments of the invention can also comprise more than two brake circuits, for example the brake system can be provided for a triple-axle towing vehicle, wherein three brake circuits are then provided, in which mutually independent respective braking pressures can be set up. Accordingly, three shuttle valves—one shuttle valve in each brake circuit—and for example a 3-channel proportionality valve or three 1-channel proportionality valves are used as the second brake valve.

Furthermore, trailer brake circuits in a trailer can also be controlled electrically and pneumatically in such a way, wherein the braking demand can be transmitted to the trailer electronically, for example by means of a trailer interface, and pneumatically by means of an electropneumatic trailer control valve. A pneumatic trailer control pressure associated with the trailer brake circuit can thus be transmitted by means of the trailer control valve to the trailer and can be converted by trailer control valves into the corresponding braking pressures in order to also bring about braking in the trailer brake circuit in the case of redundancy. In this case for example, the control pressure for one of the brake circuits of the vehicle, preferably the first brake circuit on the front axle, can be used as the trailer control pressure. Alternatively, the trailer control pressure can also be specified independently of the other brake circuits.

The embodiment according to FIG. 1a concerns a pneumatic brake system 100 in a utility vehicle 200 that is electronically controlled, with service brakes 1, 2, 3, 4 on the wheels 5, 6, 7, 8. Conventional ABS brake valves 9, 10 for controlling a braking pressure p1, p2 depending on a detected ABS braking slip situation are connected upstream of the service brakes 1, 2 on each of the wheels 5, 6 of a front axle VA. According to said embodiment, an axle modulator 11 is connected upstream of the service brakes 3, 4 on the driven wheels 7, 8 of a rear axle HA, wherein the axle modulator can electronically and pneumatically control the adjusted braking pressure p3, p4 at the individual service brakes 3, 4 in a known manner, and in doing so can take into account a slip situation at the rear wheels 7, 8. The axle modulator 11 and also the ABS brake valves 9, 10 are electronically controlled by means of a first control unit 110. However, separate control units can also be provided for the axle modulator 11 and/or the ABS brake valves 9, 10, which actuate the respective valves 9, 10, 11 individually.

According to the embodiment represented, the service brakes 1, 2, 3, 4 are actuated in two brake circuits A, B, wherein a first brake circuit A is related to the service brakes 1, 2 on the wheels 5, 6 of the front axle VA and a second brake circuit B is related to the service brakes 3, 4 on the wheels 7, 8 of the rear axle HA. In this case, the first brake circuit A comprises a relay valve 13 as a first control valve, which comprises a pneumatically implemented first relay valve control input 14 and an electrically implemented second relay valve control input 17, relay valve working connections 15 and a relay valve compressed air connection 16. The relay valve working connections 15 are connected via compressed air lines to the two service brakes 1, 2 of the front axle VA. The relay valve compressed air connection 16 connects the relay valve 13 to a first pressure reservoir container 20A for the first brake circuit A.

The relay valve 13 adjusts the braking pressures p1, p2 at the service brakes 1, 2 of the front axle VA depending on the applied relay valve control pressure pA at the first relay valve control input 14 or the applied relay valve control signal SA at the second relay valve control input 17, wherein the relay valve 13 adjusts the compressed air from the first pressure reservoir container 20A in proportion to the relay valve control pressure pA or the relay valve control signal SA at the service brakes 1, 2 of the front axle VA. Bleeding of the service brakes 1, 2 of the front axle VA to reduce pressure can be carried out by means of the relay valve 13 in proportion to the respective relay valve control pressure pA or the relay valve control signal SA, for example by means of a relay valve bleed connection 18.

Figure 4:
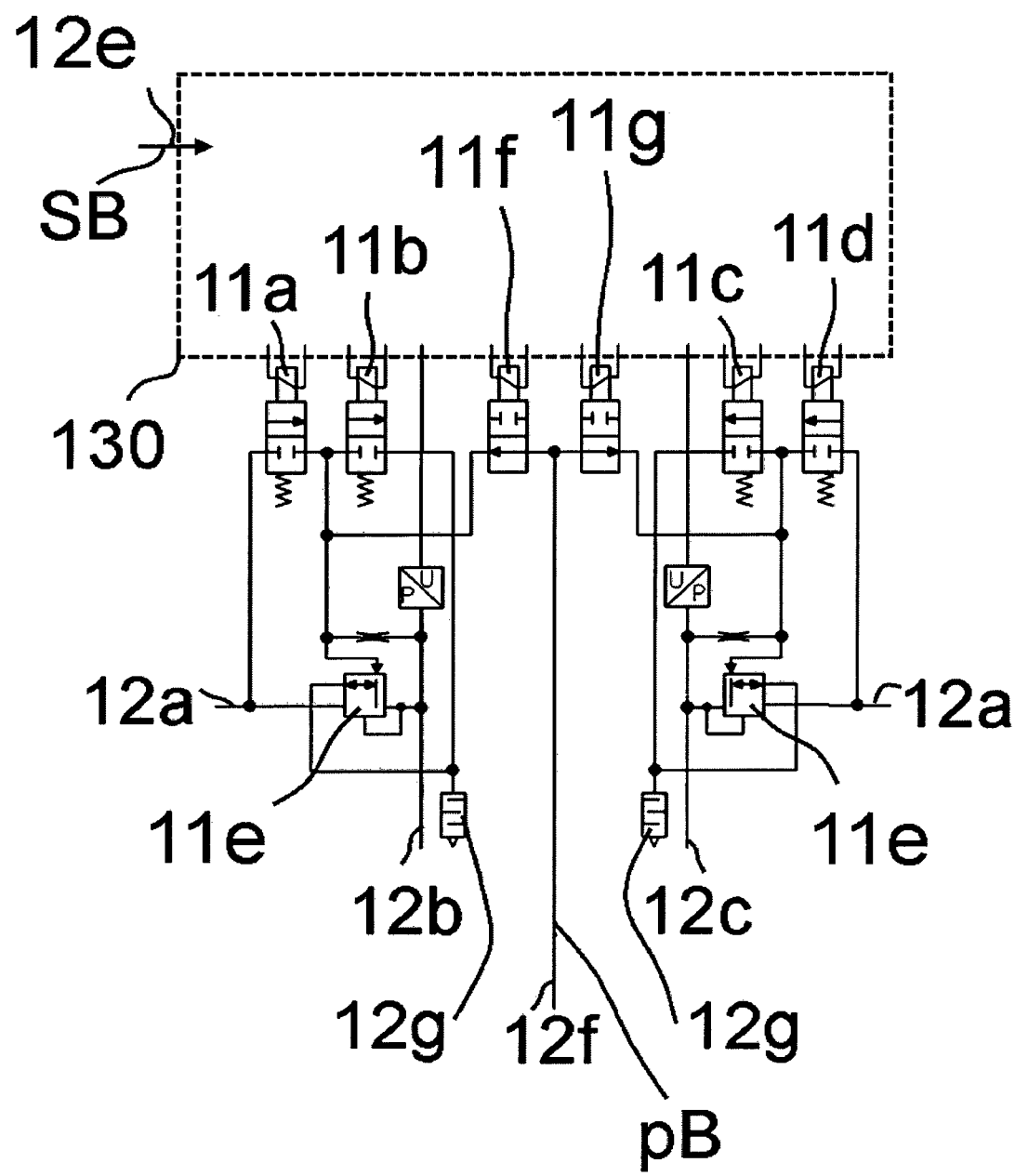
FIG. 4 shows a 2-channel axle modulator as a control valve.

For the second brake circuit B, the axle modulator 11 is provided as a second control valve, which is represented in schematic form in FIG. 4. Therefore, the axle modulator 11 comprises a first inlet valve 11a, a first outlet valve 11b, a second outlet valve 11c and a second inlet valve 11d, each of which is implemented as an electronically controlled solenoid valve. The braking pressure p4 adjusted at the left rear wheel service brake 4 is controlled by means of the first inlet valve 11a and the first outlet valve 11b, and the braking pressure p3 adjusted at the right rear wheel service brake 3 is controlled by means of the second inlet valve 11d and the second outlet valve 11c. According to said implementation, the two braking pressures p3, p4 are pneumatically controlled mutually independently in this case.

If the inlet valves 11a, 11d are opened and the outlet valves 11b, 11c are closed, then the corresponding braking pressure p3 or p4 is increased by proportionally adjusting the pneumatic working pressure from a second pressure reservoir container 20B provided at a suitable level at an axle modulator compressed air connection 12a by means of an axle modulator relay valve 11e at axle modulator working connections 12c or 12b, wherein a first axle modulator working connection 12c is connected via compressed air lines to the right rear wheel service brake 3 and a second axle modulator working connection 12b is connected to the left rear wheel brakes 4. If the inlet valves 11a, 11d are closed and the outlet valves 11b, 11c are opened, then the corresponding braking pressure p3 or p4 can be reduced by bleeding via an axle modulator bleed connection 12g. If the inlet valves 11a, 11d and the outlet valves 11b, 11c are closed, then the braking pressure p3, p4 is maintained.

The demand to increase the pressure, maintain the pressure or reduce the pressure and thereby the position of the inlet and outlet valves 11a, 11b, 11c, 11d can be controlled by the axle modulator electronics 130 of the axle modulator 11, wherein the first control unit 110 electronically specifies an axle modulator control signal SB via a first axle modulator control input 12e that determines the braking pressure p3, p4 to be adjusted, so that a target vehicle deceleration zSoll can be implemented or an ABS braking slip situation can be responded to, for example.

Furthermore, redundancy valves 11f, 11g are provided in the axle modulator 11 that can also be electronically controlled and that are also implemented as solenoid valves. Once there is a failure or a defect in the axle modulator electronics 130, the redundancy valves 11f, 11g are automatically opened and at the same time the inlet valves 11a, 11d and the outlet valves 11b, 11c are closed, for example by a suitable spring bias of the solenoid valves 11a, 11b, 11c, 11d, 11f, 11g, so that said valves are automatically mechanically brought into the appropriate position in the event of a failure, which is also represented in FIG. 4. The axle modulator relay valves 11e then no longer control the braking pressure p3, p4 depending on the electrically specified axle modulator control signals SB, but depending on a pneumatic axle modulator control pressure pB prevailing at a second axle modulator control input 12f, which is passed on by opening the redundancy valves 11f, 11g proportionally via the axle modulator relay valves 11e to the axle modulator working connections 12b, 12c. As a result, a pneumatic fallback can be resorted to. In this case, the axle modulator control pressure pB can be specified by means of a first brake valve 24, for example by manual operation of a brake pedal by the driver, or by a redundant electronic controller by means of a second brake valve 25.

Alternatively, a 1-channel axle modulator can also be provided as a first control valve 13, which then accordingly comprises only one axle modulator working connection 12b or 12c, at which a braking pressure p1, p2 at both service brakes 1, 2 of the front axle VA is adjusted that is proportional to the (relay valve) control pressure pA.

In the case of redundancy, according to an embodiment of the invention, the relay valve control pressure pA or the axle modulator control pressure pB for the relay valve 13 or the axle modulator 11 in the first or in the second brake circuit A, B is output by a pneumatically controlled shuttle valve 21A, 21B that is associated with the respective brake circuit A, B. In this case, a first shuttle valve 21A is pneumatically connected via a first compressed air line 22a to the first brake valve 24 and via a second compressed air line 22b to the second brake valve 25. The second shuttle valve 21B is accordingly connected via a third compressed air line 22c to the first brake valve 24 and via a fourth compressed air line 22d to the second brake valve 25. Alternatively, the first shuttle valve 21A can also be disposed in the relay valve 11 and the second shuttle valve 21B can be disposed in the axle modulator 13 in order to be able to transfer the control pressures pA, pB over a shorter path.

In this case, the first brake valve 24 adjusts a first brake valve-relay valve control pressure pA1 for the first brake circuit A via the first compressed air line 22a and a second brake valve-axle modulator control pressure pB1 for the second brake circuit B via the third compressed air line 22c, whereas the second brake valve 25 adjusts a second brake valve-relay valve control pressure pA2 for the first brake circuit A via the second compressed air line 22b and a second brake valve-axle modulator control pressure pB2 for the second brake circuit B via the fourth compressed air line 22d.

The two shuttle valves 21A, 21B operate in such a way that they each pass through the higher of the two brake valve-relay valve control pressures pA1 or pA2 or the higher of the two brake valve axle modulator control pressures pB1 or pB2. Thus in the case of redundancy, the relay valve 13 or the axle modulator 11 is pneumatically controlled either by the first brake valve 24 or by the second brake valve 25 depending on which brake valve 24, 25 is specifying the higher braking demand.

Thus, a braking pressure p1, p2, p3, p4 can be specified for the service brakes 1, 2, 3, 4 on the front axle VA and the rear axle HA by means of the two shuttle valves 21A, 21B pneumatically independently of each other. To provide the brake valve-relay valve control pressure pA1, pA2 or the brake valve-axle modulator control pressure pB1, pB2, the brake valves 24, 25 are each coupled to the pressure reservoir container 20A, 20B.

Figure 1B:
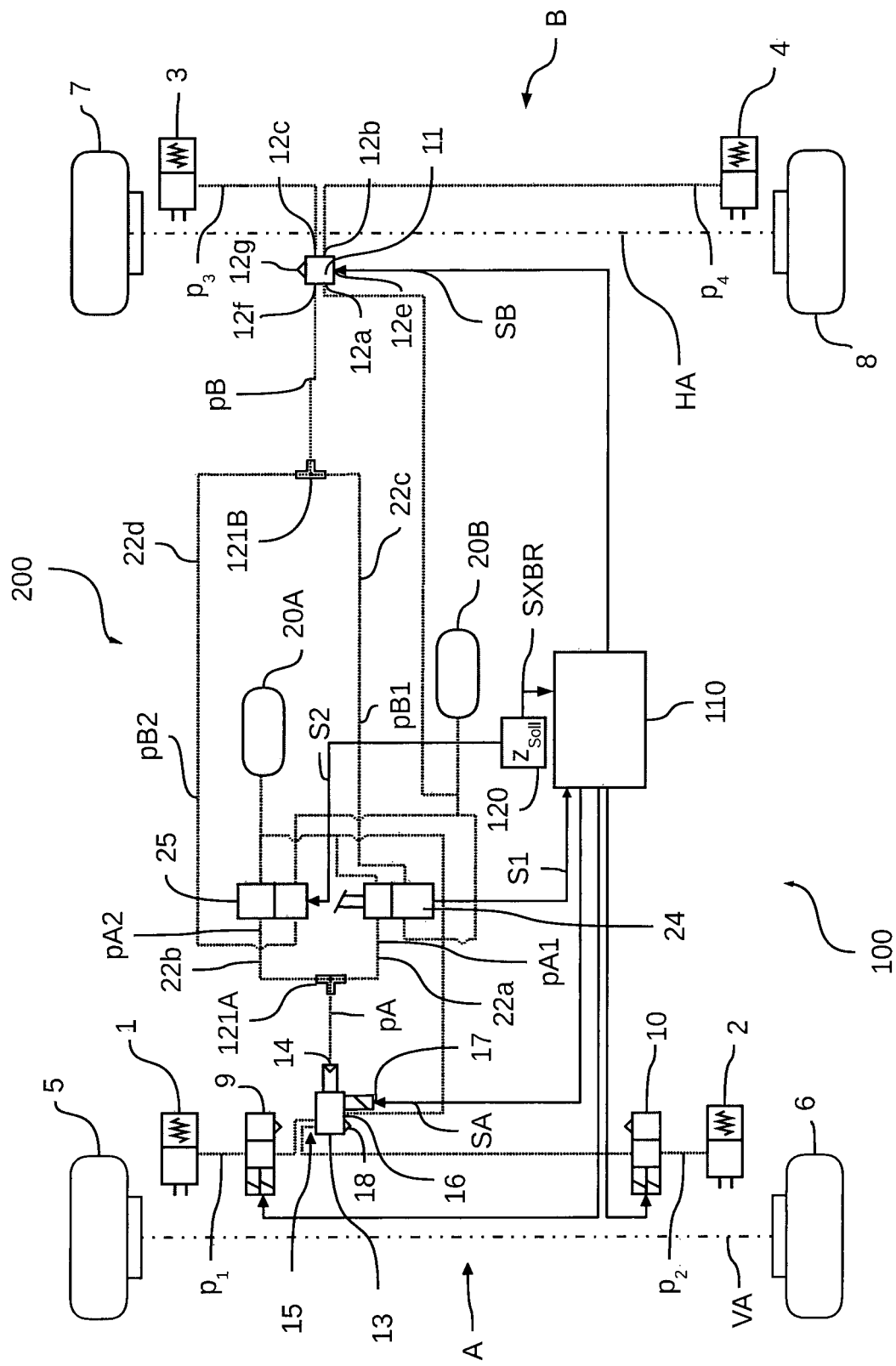

Alternatively, according to FIG. 1b it can be provided, instead of the shuttle valves 21A, 21B, to use a T-piece 121A, 121B in each case that passes the respective first brake valve control pressure pA1, pB1 and the respective second brake valve control pressure pA2, pB2 to the respective control valve 13, 11 at the same time, so that a sum pSA, pSB, i.e. pSA=pA1+pA2 or pSB=pB1+pB2 or an average value MSA, MSB, i.e. MSA=(pA1+pA2)/2 or MSB=(pB1+pB2)/2 is adjusted at the respective control valve 13 as the control pressures pA, pB. I.e. a first T-piece 121A in the first brake circuit A adjusts the relay valve control pressure pA=pSA=pA1+pA2 or MSA=(pA1+pA2)/2 at the relay valve 13 and a second T-piece 121B in the second brake circuit B adjusts an axle modulator control pressure pB=pSB=pB1+pB2 or MSB=(pB1+pB2)/2 at the axle modulator 11. As a result, a simplified redundancy function can also be achieved during the operation of the brake pedal.

Figure 2:
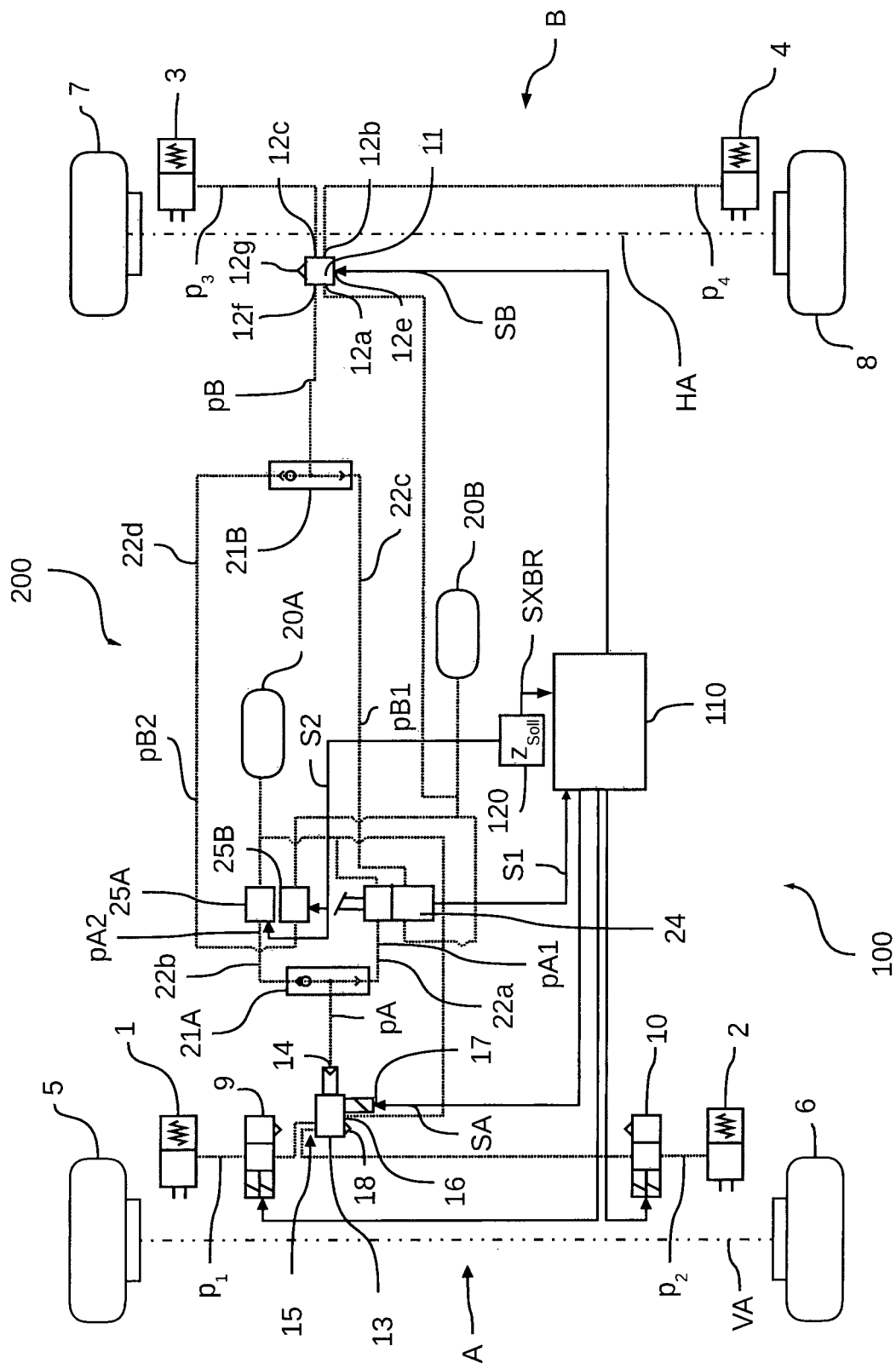
FIG. 2 is a block diagram of a vehicle with an electronically controlled pneumatic brake system according to an alternative embodiment.

In this case, the control of the brake system 100 can be carried out as follows:

Because according to FIGS. 1a, 1b and 2 it is an electronically controlled pneumatic brake system 100 (EBS), the relay valve 13 and the axle modulator 11 are electrically controlled by the first control unit 110 during normal operation of the vehicle 200 by electrically transmitting the relay valve control signal SA to the relay valve 13 via the second relay valve control input 17, which then adjusts a corresponding braking pressure p1, p2 at the service brakes 1, 2 of the front axle VA. The axle modulator control signal SB is electrically transmitted via the first axle modulator control input 12e to the axle modulator 11, which then sets the corresponding braking pressure p3, p4 at the service brakes 3, 4 of the rear axle HA via the inlet valves 11a, 11d and the outlet valves 11b, 11c according to the above embodiments. During normal operation, the redundancy valves 11f, 11g are closed.

The relay valve control signal SA and the axle modulator control signal SB are preferably specified by the first control unit 110 depending on a target vehicle deceleration zSoll. This can either be specified by an electronic control system that is controlled by a second control unit 120 and designed to control the vehicle 200 autonomously by means of the XBR signal SXBR or by the first brake valve 24, which for example is implemented as a brake value transmitter, which can transmit a corresponding actuation signal S1 to the first control unit 110 depending on the operation of the brake pedal by a driver. This produces therefrom the corresponding relay valve control signal SA for the first brake circuit A and the axle modulator control signal SB for the second brake circuit B to bring about the target vehicle deceleration specified by the driver, so that the autonomously controlled vehicle 200 can also be manually decelerated by the driver, for example in a emergency braking situation.

In the event of a failure of the electronics, i.e. in the case in which the first control unit 110 is no longer receiving the XBR signal SXBR from the second control unit 120, and thus the relay valve 13 and/or the axle modulator 11 can no longer adjust or the relay valve control signal SA and/or the axle modulator control signal SB are faulty, the pneumatic fallback can be resorted to in the respective brake circuit A, B, i.e., the relay valve control pressure pA or the axle modulator control pressure pB are used to adjust the braking pressures p1, p2 or p3, p4 to control the relay valve 13 or the axle modulator 11 and hence are transmitted from the electronic control inputs 17, 12e to the pneumatic control inputs 14, 12f of the respective control valve 11, 13. This is carried out as already described by means of suitable spring-loaded redundancy valves for example, so that in the event of a failure of the electronics a mechanical changeover from electronic actuation to pneumatic actuation can be carried out.

For pneumatic control in the case of redundancy, the second brake valve 25 is controlled by the second control unit 120 with a demand signal S2 that is proportional to the target vehicle deceleration zSoll. Depending thereon, the second brake valve-relay valve control pressure pA2 is output by the second brake valve 25 via the second pressure line 22b to the first shuttle valve 21A and the second brake valve-axle modulator control pressure pB2 is output via the fourth pressure line 22d to the second shuttle valve 21B.

In this case, the second brake valve 25 can for example be implemented as any proportionality valve, which produces the second brake valve-relay valve control pressure pA2 or the second brake valve-axle modulator control pressure pB2 in proportion to the demand signal S2 and adjusts the pressure at the shuttle valves 21A, 21B of the individual brake circuits A, B. In this case, as shown in FIGS. 1a, b for two brake circuits A, B, a 2-channel proportionality valve 25 can be provided, which can produce the second brake valve-relay valve control pressure pA2 and the second brake valve-axle modulator control pressure pB2 pneumatically independently of each other, or a separate proportionality valve 25A, 25B for each brake circuit A, B as shown in FIG. 2, wherein a first proportionality valve 25A produces the second brake valve-relay valve control pressure pA2 and a second proportionality valve 25B produces the second brake valve-axle modulator control pressure pB2. In this case, the first proportionality valve 25A can also be integrated within the relay valve 13 and the second proportionality valve 25B can be integrated within the axle modulator in order to obtain shorter paths between the components.

Figure 5:
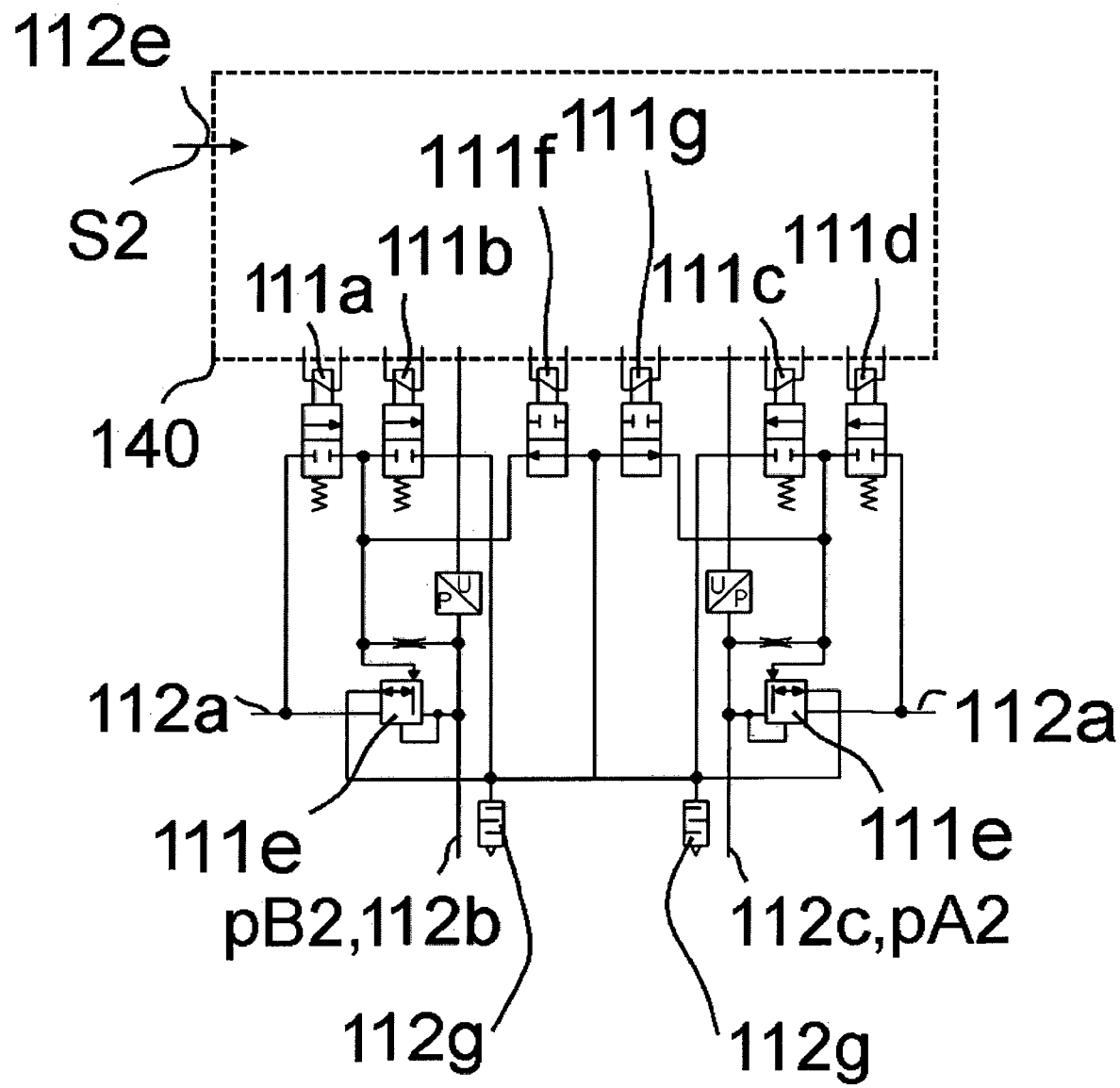
FIG. 5 shows a 2-channel axle modulator as a second brake valve.
Figure 6:
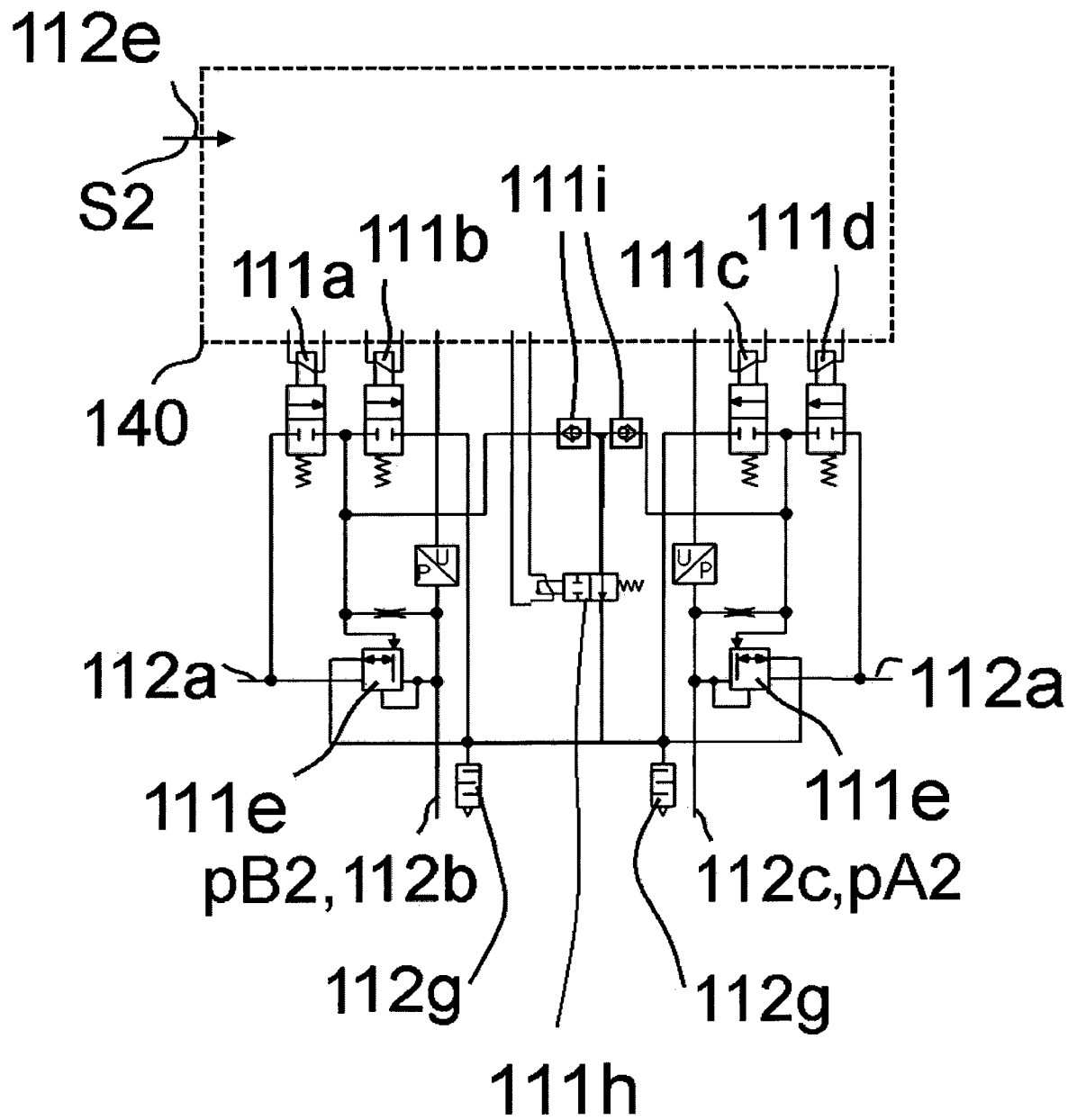
FIG. 6 shows an alternative embodiment of a 2-channel axle modulator as a second brake valve.

In this case for example, a component operating as an axle modulator can also be used as a 2-channel proportionality valve. Such a second brake valve 25 is represented in FIGS. 5 and 6. Therefore, the second brake valve 25 that is implemented as an axle modulator comprises a first brake valve-inlet valve 111a, a first brake valve-outlet valve 111b, a second brake valve-outlet valve 111c and a second brake valve-inlet valve 111d, each of which is implemented are as an electronically controlled solenoid valve. The second brake valve-relay valve control pressure pA2 that is adjusted in the first brake circuit A is controlled by means of the first brake valve-inlet valve 111a and the first brake valve-outlet valve 111b and the second brake valve-axle modulator control pressure pB2 that is adjusted in the second brake circuit B is controlled by means of the second brake valve-inlet valve 111d and the second brake valve-outlet valve 111c. In this case according to said implementation, the two second brake valve control pressures pA2, pB2 are controlled pneumatically independently of each other.

If the brake valve-inlet valves 111a, 111d are opened and the brake valve-outlet valves 111b, 111c are closed, then the corresponding second brake valve control pressure pA2, pB2 is increased by adjusting the pneumatic working pressure, which is provided at a suitable level at a brake valve compressed air connection 112a from a second pressure reservoir container 20B, via a brake valve-relay valve 111e in proportion at the brake valve working connections 112c or 112b, wherein a first brake valve working connection 112c is connected via the second compressed air line 22b to the first shuttle valve 21A and a second brake valve working connection 112b is connected via the fourth compressed air line 22d to the second shuttle valve 21B. If the brake valve-inlet valves 111a, 111d are closed and the brake valve-outlet valves 111b, 111c are opened, then the corresponding second brake valve control pressure pA2, pB2 can be reduced by bleeding via a brake valve bleed connection 112g. If the brake valve-inlet valves 111a, 111d and the brake valve-outlet valves 111b, 111c are closed, then the second brake valve control pressure pA2, pB2 is maintained.

The specification for increasing the pressure, maintaining the pressure or reducing the pressure and thus the position of the brake valve-inlet valves and the brake valve-outlet valves 111a, 111b, 111c, 111d can be controlled by the brake valve-electronics 140 of the second brake valve 25, wherein the second control unit 110 specifies the demand signal S2 electronically via a brake valve control input 112e, which determines the second brake valve control pressure pA2, pB2 to be adjusted, so that for example a target vehicle deceleration zSoll can be implemented redundantly.

Furthermore, brake valve-redundancy valves 111f, 111g that can also be electronically controlled and that are also implemented as solenoid valves are provided in the second brake valve 25 that is implemented as an axle modulator. Once there is a failure or a defect in the brake valve-electronics 140, the brake valve-redundancy valves 111f, 111g are automatically opened and at the same time the brake valve-inlet valves 111a, 111d and the brake valve-outlet valves 111b, 111c are closed, for example by a suitable spring bias of the solenoid valves 111a, 111b, 111c, 111d, 111f, 111g, so that in the event of a failure said valves are automatically mechanically brought into the appropriate position, which is also shown in FIG. 5. In this case, the brake valve-relay valves 111e are connected to the brake valve bleed connection 112g, so that controlled bleeding can be carried out in the event of an electronic failure.

Alternatively, according to FIG. 6 instead of the two brake valve-redundancy valves 111f, 111g for both brake circuits A, B, a single brake valve-redundancy valve 111h can be provided that connects two brake valve-relay valves 111e to the brake valve bleed connection 112g at the same time. In order to pneumatically separate the actuation of both brake valve-relay valves 111e in normal operation, an additional non-return valve 111i is provided in the respective brake circuit A, B, so that the two brake valve-relay valves 111e are not pneumatically connected to each other.

If in the case of redundancy, no driver braking is specified by means of the first brake valve 24, i.e. the first brake valve-relay valve control pressure pA1 and the first brake valve-axle modulator control pressure pB1 are approximately zero, the larger second brake valve-relay valve control pressure pA2 is passed through by the first shuttle valve 21A. Accordingly, the second shuttle valve 21B can pass the second brake valve-axle modulator control pressure pB2 through. Thus, the relay valve 13 is controlled by the relay valve control pressure pA prevailing at the first relay valve control input 14 and corresponding to the second brake valve-relay valve control pressure pA2 and the axle modulator 11 is controlled by the axle modulator control pressure pB prevailing at the second axle modulator control input 12f and corresponding to the second brake valve-axle modulator control pressure pB2. The relay valve 13 or the axle modulator 11 then adjusts the corresponding braking pressure p1, p2 or p3, p4 at the service brakes 1, 2 or 3, 4 in proportion thereto.

Thus, in the event of a failure or a defect in the electronics of the relay valve 13 and the axle modulator 11 or the signal connection from the first to the second control unit 110, 120, the target vehicle deceleration zSoll electronically specified by the second control unit 120 can still be enforced by pneumatically controlling the relay valve 13 and the axle modulator 11 by the second brake valve 25.

So that the driver can still manually intervene even in the event of a failure of the electronics, for example in an emergency braking situation, in the event of operation of the brake pedal by the driver in the case of redundancy, the first brake valve 24 adjusts the first brake valve-relay valve control pressure pA1 and the first brake valve-axle modulator control pressure pB1 for the respective brake circuit A, B via the compressed air lines 22a, 22c. If the braking demand is greater than the braking demand that is electrically specified by the second brake valve 25 by means of the demand signal S2, the first shuttle valve 21A or the second shuttle valve 21B adjusts the first brake valve-relay valve control pressure pA1 or the first brake valve-axle modulator control pressure pB1 as the relay valve control pressure pA or as the axle modulator control pressure pB at the relay valve 13 or the axle modulator 11, so that a suitable braking pressure p1, p2 or p3, p4 according to the driver's demand can be set at the service brakes 1, 2 or 3, 4 even in the case of redundancy. As a result, further redundancy can be achieved.

Thus, in the event of a failure of the electronics a pneumatically controlled fallback can be created by controlling the second brake valve 25 electronically. If the driver additionally specifies a braking demand by operating the brake pedal, for example in an emergency braking situation, the electronic braking demand is overridden.

Said fallback only operates for one brake circuit A, B, i.e. if only the electronic actuation for the relay valve 13 or the axle modulator 11 fails. Then, in one brake circuit A, B electronic actuation can take place and in the respective other brake circuit B, A pneumatic actuation can take place via the second brake valve 25.

Figure 3:
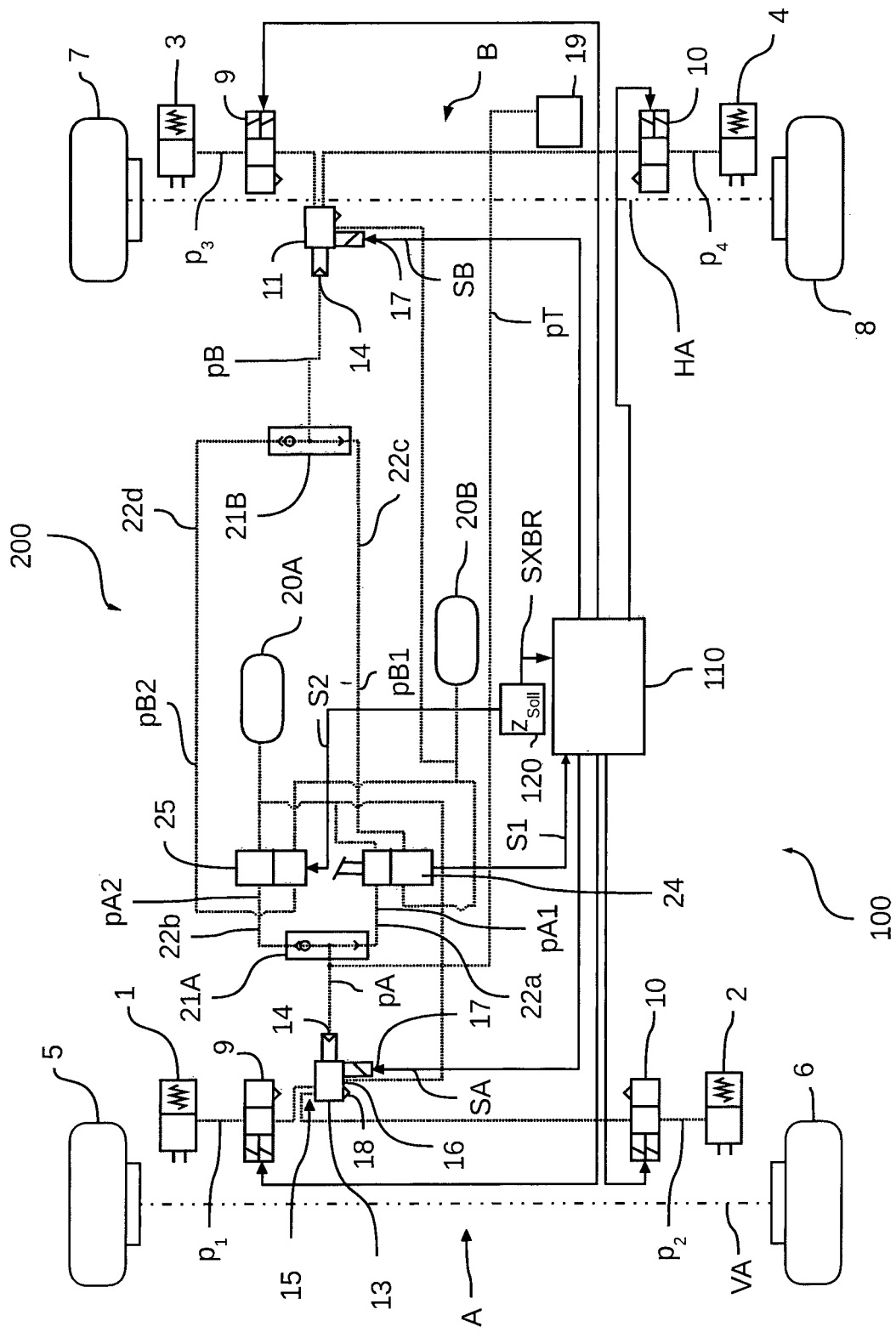
FIG. 3 is a block diagram of a vehicle with an electronically controlled pneumatic brake system with an ABS controller.

Alternatively, as shown in FIG. 3, as a brake system 100 there can also be an ABS brake system 100 that comprises respective ABS brake valves 9, 10 on both vehicle axles VA, HA. A braking pressure p1, p2, p3, p4 is provided at the service brakes 1, 2, 3, 4 by means of the control valves 11, 13, wherein said pressure can be maintained or reduced by the ABS brake valves 9, 10 in an ABS braking slip situation. In this case, the control valves 11, 13 are implemented identically and are each implemented as a relay valve, which can both be electronically controlled by means of the electronic relay valve control input 17 and also pneumatically by means of the pneumatic relay valve control input 14. In this case, the pneumatic relay valve control input 14 is implemented as a 3/2-way valve, which lets a suitable pressure into the relay valve depending on an existing control signal SA, SB. If the control valves 11, 13 can no longer be controlled by means of the control signals SA, SB, then according to the EBS brake system 100 in FIGS. 1a, 1b and 2, then a pneumatic control pressure pA, pB is set by means of the second brake valve 25 at the pneumatic relay valve control input 14, for example by means of the respective shuttle valve 21A, 21B.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 2, 3, 4 service brakes
5, 6, 7, 8 wheels of the utility vehicle 200
9, 10 ABS brake valves
11 axle modulator
11a first inlet valve
11b first outlet valve
11c second outlet valve
11d second inlet valve
11e axle modulator relay valve
11f, 11g redundancy valves
12a axle modulator compressed air connection
12b, 12c axle modulator working connections
12e first axle modulator control input (electrical)
12f second axle modulator control input (pneumatic)
12g axle modulator bleed connection
13 relay valve
14 first relay valve control input (pneumatic)
15 relay valve working connection
16 relay valve compressed air connection
17 second relay valve control input (electrical)
18 relay valve bleed connection
19 trailer control valve
20A first pressure reservoir container
20B second pressure reservoir container
21A first shuttle valve
21B second shuttle valve
22a first compressed air line
22b second compressed air line
22c third compressed air line
22d fourth compressed air line
24 first brake valve
25 second brake valve
100 pneumatic brake system
110 first control unit
111a first brake valve-inlet valve
111b first brake valve-outlet valve
111c second brake valve-outlet valve
111d second brake valve-inlet valve
111e brake valve-relay valve
111f, 111g brake valve-redundancy valve
112a brake valve compressed air connection
112b, 112c brake valve working connections
112e brake valve control input
120 second control unit
121A first T-piece
121B second T-piece
130 axle modulator-electronics
140 brake valve-electronics
200 utility vehicle
A first brake circuit
B second brake circuit
HA rear axle
MSA, MSB average value of the brake valve control pressures
p1, p2, p3, p4 braking pressure at the service brakes 1, 2, 3, 4
pA relay valve control pressure
pA1 first brake valve-relay valve control pressure pA2 second brake valve-relay valve control pressure
pB axle modulator control pressure
pB1 first brake valve-axle modulator control pressure
pB2 second brake valve-axle modulator control pressure
pSA, pSB sum of the brake valve control pressures
pT trailer control pressure
S1 actuation signal
S2 demand signal
SA relay valve control signal
SB axle modulator control signal
SXBR XBR signal
VA front axle
zSoll target vehicle deceleration

The invention claimed is:

1. An electronically controllable pneumatic brake system, comprising:
   a brake circuit, wherein in the brake circuit, braking pressures at service brakes are adjustable independently of each other, wherein, for the purpose of adjusting, at least one control valve is associated with the brake circuit, wherein the control valve comprises an electronic control input for receiving an electrical control signal and a pneumatic control input for receiving a control pressure, and wherein the control valve is configured to supply the service brakes of the brake circuit with a braking pressure via working connections depending on the control signals or the control pressure,
   a first control unit for outputting the electronic control signal depending on a target vehicle deceleration for the electrical actuation of the control valve, wherein the target vehicle deceleration can be specified by a first brake valve, and
   the first brake valve, configured to specify a first brake valve control pressure at the at least one brake circuit,
   a second brake valve configured to output a second brake valve control pressure, the second brake valve being disposed in the pneumatic brake system such that the first brake valve control pressure of the first brake valve and/or the second brake valve control pressure of the second brake valve is output as the control pressure to the control valve for the pneumatic actuation of the control valve,
   wherein the second brake valve is configured to be electronically controlled if electrical actuation of the control valve is prevented to create an electronically-pneumatically controlled redundancy.

2. The electronically controllable pneumatic brake system as claimed in claim 1, wherein, depending on the control signal or the control pressure, the control valve supplies the service brakes of the brake circuit with a braking pressure proportional to the control signal or to the control pressure.

3. The electronically controllable pneumatic brake system as claimed in claim 1, wherein the control valve comprises a directional valve that can be actuated by the first control unit, in particular in a pulsed manner, to supply the service brakes with the braking pressure.

4. The electronically controllable pneumatic brake system as claimed in claim 1, wherein the first brake valve and the second brake valve are connected via compressed air lines to a shuttle valve to adjust the first brake valve control pressure through the first brake valve and the second brake valve control pressure through the second brake valve to the shuttle valve,
   wherein the shuttle valve is connected to the pneumatic control input of the control valve and the shuttle valve only passes a selected brake valve control pressure, in particular the higher, of the brake valve control pressures adjusted by the two brake valves as the control pressure to the pneumatic control input of the control valve to provide redundancy.

5. The electronically controllable pneumatic brake system as claimed in claim 4, wherein the shuttle valve is integrated within the control valve of the brake circuit or the first brake valve or the second brake valve.

6. The electronically controllable pneumatic brake system as claimed in claim 1, wherein the first brake valve and the second brake valve are connected via compressed air lines to a T-piece to adjust the first brake valve control pressure through the first brake valve and the second brake valve control pressure through the second brake valve at the T-piece,
   wherein the T-piece is connected to the pneumatic control input of the control valve and the T-piece passes a sum or an average value of the brake valve control pressures adjusted by the first and second brake valves in the brake circuit as the control pressure to the pneumatic control input of the control valve to provide redundancy.

7. The electronically controllable pneumatic brake system as claimed in claim 1, wherein the control valve is implemented as a relay valve, wherein the relay valve comprises a first relay valve control input for receiving the control pressure as a relay valve control pressure, a second relay valve control input for receiving the electronic control signal as a relay valve control signal, and relay valve working connections for outputting a braking pressure to the service brakes, wherein the braking pressure is proportional to the relay valve control pressure or to the relay valve control signal.

8. The electronically controllable pneumatic brake system as claimed in claim 7, wherein the relay valve can only be pneumatically actuated by means of the relay valve control pressure if electrical actuation by means of the relay valve control signal is prevented.

9. The electronically controllable pneumatic brake system as claimed in claim 1, wherein the control valve is implemented as an axle modulator, wherein the axle modulator comprises a first axle modulator control input for receiving an axle modulator control signal, a second axle modulator control input for receiving an axle modulator control pressure and axle modulator working connections for outputting a braking pressure to the service brakes, wherein the braking pressure is proportional to the axle modulator control pressure or to the axle modulator control signal.

10. The electronically controllable pneumatic brake system as claimed in claim 9, wherein the axle modulator can only be pneumatically actuated by means of the axle modulator control pressure if electrical actuation by means of the axle modulator control signal is prevented.

11. The electronically controllable pneumatic brake system as claimed in claim 1, wherein the brake system is implemented as a dual-circuit brake system including the brake circuit and a second brake circuit, the brake system further comprising:
    a second control valve associated with the second brake circuit,
    wherein the second control valves is configured to be electrically controlled by means of a second electronic control signal and also pneumatically controlled by means of a second control pressure.

12. The electronically controllable pneumatic brake system as claimed in claim 1, wherein the first brake valve is implemented as a brake value transmitter and the brake value transmitter is configured to output a first brake valve control pressure that is proportional to an operation of a brake pedal by a driver for the brake circuit and/or is configured to transmit an electrical actuation signal that is proportional thereto to the first control unit.

13. The electronically controllable pneumatic brake system as claimed in claim 1, wherein the second brake valve is a proportionality valve, which depending on an electrical demand signal outputs a second brake valve control pressure that is proportional thereto.

14. The electronically controllable pneumatic brake system as claimed in claim 13, wherein a 1-channel proportionality valve is provided in the second brake valve for the brake circuit, wherein the 1-channel proportionality valve outputs a second brake valve control pressure to the brake circuit or the second brake valve is implemented as a multi-channel proportionality valve, which outputs the second brake valve control pressures for the brake circuit and for one or more additional brake circuits pneumatically independently of each other.

15. The electronically controllable pneumatic brake system as claimed in claim 13, wherein the second brake valve is implemented as an axle modulator, in particular a 1-channel-axle modulator or a 2-channel-axle modulator.

16. The electronically controllable pneumatic brake system as claimed in claim 13, wherein the second brake valve, which is in particular embodied as a proportionality valve, is integrated within the control valve of the brake circuit or in the first brake valve.

17. The electronically controllable pneumatic brake system as claimed in claim 1, wherein the second brake valve is implemented as a directional valve that can be actuated depending on an electrical demand signal, in particular in a pulsed manner, for outputting the second brake valve control pressure.

18. The electronically controllable pneumatic brake system as claimed in claim 1, wherein a second control unit is provided in the electronically controllable pneumatic brake system that is designed to specify a target vehicle deceleration and to actuate the second brake valve electronically with a demand signal if electrical actuation of the control valve is prevented to provide electronically-pneumatically controlled redundancy.

19. The electronically controllable pneumatic brake system as claimed in claim 18, wherein the first brake valve can be actuated electronically or electromechanically, for example by the first control unit and/or the second control unit, to provide additional mechanical-pneumatic redundancy.

20. The electronically controllable pneumatic brake system as claimed in claim 18, wherein the second control unit is implemented as a controller for an autonomously controlled utility vehicle and the second control unit is connected to the first control unit to transmit an XBR signal to specify the target vehicle deceleration.

21. The electronically controllable pneumatic brake system as claimed in claim 18, wherein the second control unit is integrated within the first control unit.

22. The electronically controllable pneumatic brake system as claimed in claim 1, further comprising a trailer control valve that can be controlled with a trailer control pressure specified by the first brake valve and/or the second brake valve to provide redundancy for a trailer vehicle.

23. The electronically controllable pneumatic brake system as claimed in claim 1, wherein the brake system is an ABS brake system or an EBS brake system.

24. A vehicle, in particular a utility vehicle, with an electronically controlled pneumatic brake system as claimed in claim 1.

25. A method for the electronic control of a pneumatic brake system, the method comprising at least the following steps:

detecting whether there is a failure or a defect in an electronic actuation of a control valve of a brake circuit, in particular a defect in the control unit;

actuating a second brake valve with a demand signal such that the second brake valve outputs a second brake valve control pressure, so that in the pneumatic brake system either a first brake valve control pressure of a first brake valve or the second brake valve control pressure of the second brake valve is output as a control pressure to the control valve.

* * * * *